Nov. 10, 1959 A. G. LAUCK 2,912,093
HIGH SPEED ARTICLE TRANSFER APPARATUS
Filed Dec. 27, 1957 2 Sheets-Sheet 1

INVENTOR
ALBERT G. LAUCK
BY J. R. NELSON
W. A. SCHAICH
ATTORNEYS

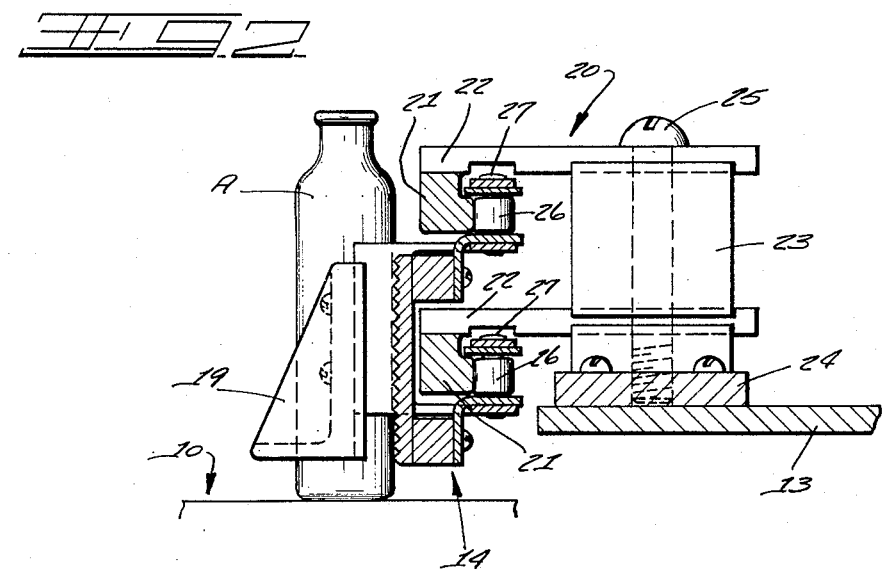
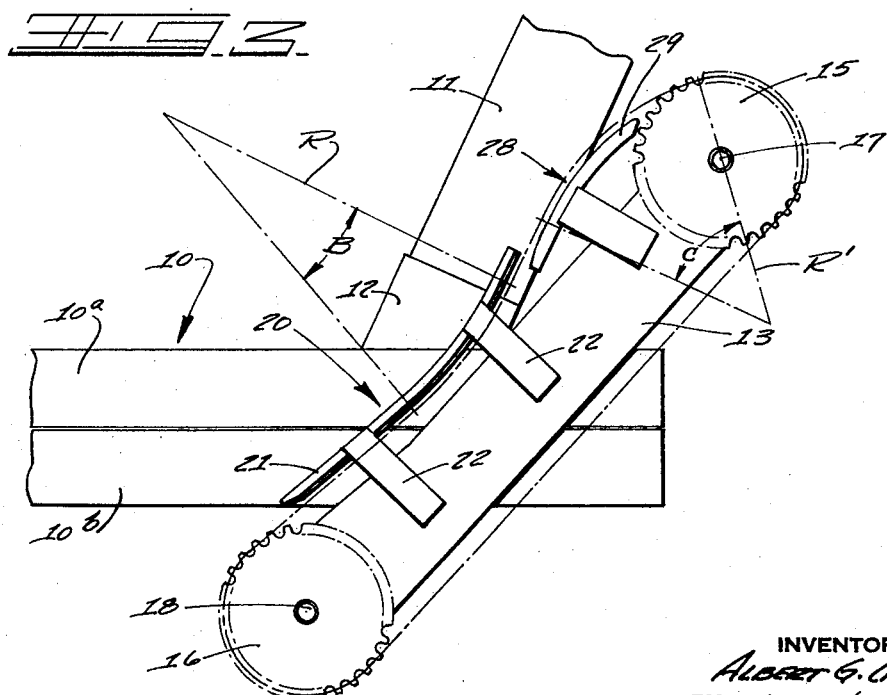

United States Patent Office 2,912,093
Patented Nov. 10, 1959

2,912,093

HIGH SPEED ARTICLE TRANSFER APPARATUS

Albert G. Lauck, Toledo, Ohio, assignor to Owens-Illinois Glass Company, a corporation of Ohio Application December 27, 1957, Serial No. 705,516

4 Claims. (Cl. 198—32)

The present invention relates to improved transfer device for transferring articles, such as bottles, jars or the like, from one or more rows on one horizontal conveyor to a second horizontal conveyor adjacent the first, and more particularly to such an article transfer device capable of transferring glassware articles from one conveyor to another in a single file row on the latter and at spaced distances within that single file row.

An object of the invention is to provide an article transfer device of the class described which is capable of receiving articles while on the first conveyor and pushing them diagonally thereacross toward the second conveyor by initially angularly changing their direction of travel somewhat less than their ultimate direction of travel on the second conveyor and just prior to reaching the second conveyor redirecting the path of the articles to align them on the second conveyor.

Another object of the invention is to provide article transfer device, as aforesaid, that effects the transfer by an endlessly traveling chain disposed diagonally across the first conveyor and over the second conveyor and impels the articles by pushing engagement of outwardly projecting transfer fingers carried by the chain, the path of the chain during transfer of the articles across the first conveyor toward the second conveyor being of an angle less than the angular displacement between the directions of travel of the first and second conveyors and the chain thereupon being guided through a path describing a compound curve to align the articles with the second conveyor and when placed thereon, the fingers having their speed reduced relative to the article on the second conveyor to clear the article without wiping engagement thereagainst.

A further object of the invention is to eliminate this wiping engagement between transfer finger and article and thereby prevent upset or jamming of the articles during transfer to the second conveyor.

A still further object of the invention is to provide a transfer device that will effectively transfer articles carried on conveyors at high speed, yet eliminates need for stationary guide rails or stripper bars to align the articles and release them from the transfer fingers, the friction drag on the articles by such guide rails or stripper bars being now unnecessary to align them on the secondary conveyor.

The specific nature of this invention as well as other objects and advantages thereof, will become apparent to those skilled in the art from the following detailed description, taken in conjunction with the annexed sheets of drawings, on which, by way of preferred example only, is illustrated an embodiment of this invention.

On the drawings:

Fig. 2 is a sectional elevational view taken along lines 2—2 of Fig. 1.

Fig. 3 is a partial plan view of the transfer device of Fig. 1, showing guide members and its mounting for guiding one reach of the transfer chain through a path of compound curvature.

Figure 1:
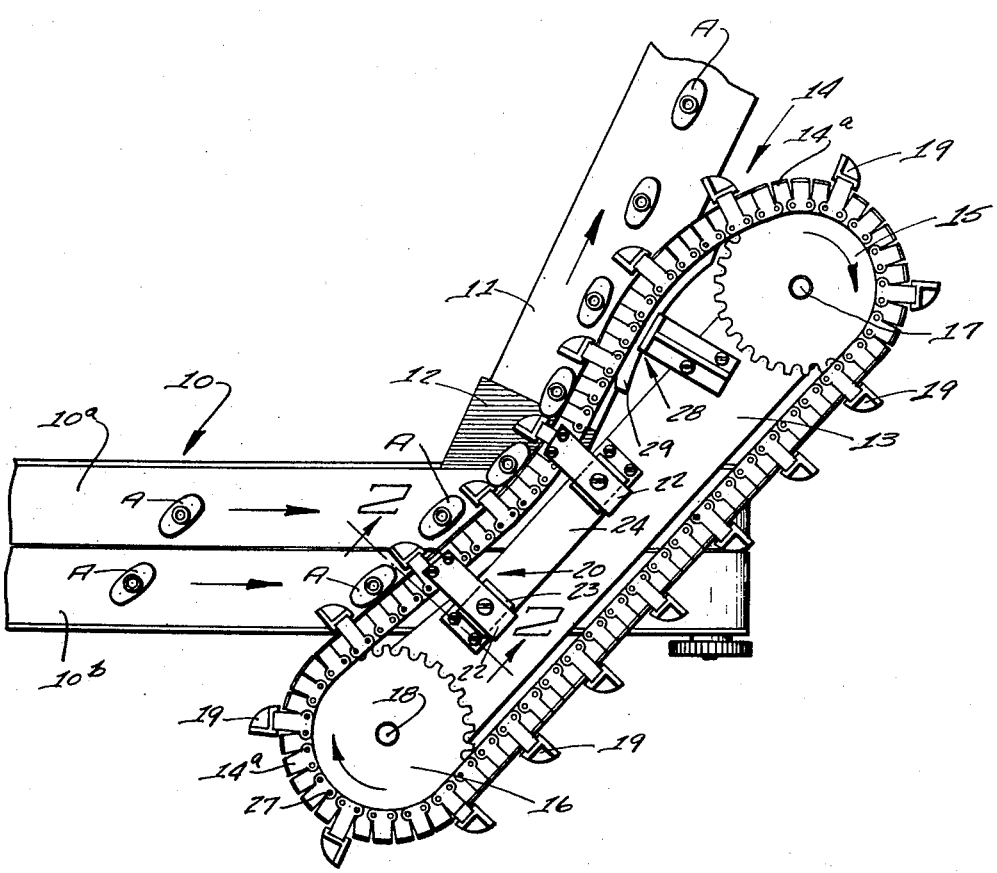
Fig. 1 is a plan view of the transfer device of the invention, illustrating its operation in transferring a pair of in-line rows of bottles from one conveyor to another.

As herein illustrated on Figs. 1 and 3, the invention is applied to effect the transfer of glass bottles A from the conveyor belts 10a and 10b of a first straight-line conveyor, referred to generally at reference numeral 10, to the conveyor belt 11 of an adjacent second conveyor. The conveyor belts are all at the same elevation and are driven by power means (not shown) to travel in the directions indicated by the arrows (Fig. 1). A dead plate 12 is positioned between the adjacent belts 10a and 11 and is at the same elevation to enable sliding transfer of the articles A from one belt to the other.

The invention is herein shown and described as adapted as an improvement of the "Conveyor Apparatus" disclosed in a copending application of Charles F. Seibert, Serial No. 675,169, filed July 30, 1957, and owned by common assignee herewith. The drive means for the conveyors as well as the make-up of the hereinafter described transfer chain should be easily understood by reference to the aforementioned Seibert disclosure.

Referring now to Fig. 1, a base or frame 13 is supported on the factory floor (not shown) and overlies conveyor 10. An endless carrier chain 14 is mounted to run on the sprockets 15 and 16 in overlying relationship to conveyors 10 and 11 and dead plate 12. Sprockets 15 and 16 are mounted, respectively, on vertical shafts 17 and 18 journaled in frame 13 so as to be held in spaced apart relationship and define an endless span of chain 14. Transfer fingers 19 are mounted as links of the chain 14 and project outwardly therefrom. The transfer fingers are provided at equally spaced distances along chain 14 as a part of the contiguous make-up of the transfer chain 14.

A first stationary guide member assembly 20 is mounted in a fixed location on frame 13 intermediate sprockets 15 and 16. As seen on Fig. 2, guide member assembly 20 compises a pair of cams 21 integrally connected on one end of brackets 22 and are vertically spaced apart at the proper operating elevation by intermediate spacer 23 and a lower spacer plate 24 that is bolted to frame 13. The assembly 20 is fastened to frame 13 by bolt 25 threaded in lower spacer plate 24. The carrier chain 14 is guided by the cam surfaces 21 which bear inwardly against rollers 26 of the chain. Rollers 26 are pivotally mounted on pins 27 which interconnect the links 14a of the chain 14.

As seen on Fig. 3, cams 21 of the first guide member assembly 20 extend diagonally across the first conveyor belt 10b and a portion of conveyor belt 10a in a straight-line whereupon its configuration becomes concave conforming to an arcuate segment B generated on a radius R. The straight-line portion of the cams 21 extends across the first conveyor 10 at an angle thereto which requires less change in direction of an intercepted article A than is necessary to completely transfer it to the second conveyor 11. However, the concave portion of the cam 21 through arc segment B completes the directional change for conveying articles A to align them longitudinally along the second conveyor 11.

Beyond the first guide member assembly 20 is a second guide member assembly 28 constructed similarly to the just described guide assembly 20, however, its pair of cam surfaces 29 are of convex curvature, as generated from the radius R'. Further, since the second guide member 28 defines a convex configuration as contrasted to the concave portion of the first guide member 20, it must necessarily bear against the rollers 26 of chain 14 in an outwardly facing direction.

As seen on Fig. 1, the bottles A travel in separate rows on conveyors 10a and 10b until they are intercepted by the carrier chain 14 which is traveling in a clockwise direction toward the second conveyor 11. When the bottles are initially intercepted, the straight-line travel of the chain 14 is of lesser slope or angle of change than required for the ultimate transfer to the second conveyor and as the bottles are about to leave the first conveyor at conveyor belt 10a, the path of chain 14 begins its concave portion to complete the change of direction of the bottles during the transfer to align them in a single line with the second conveyor 11. During this process, the transfer fingers 19 engage the bottles to push them across the conveyor belts and across the intermediate dead plate 12. After crossing the dead plate, the bottles A are picked up by the conveyor belt of conveyor 11 and are moved thereon. The carrier chain 14 is driven to run at a linear speed approximately the same as the surface speed of the conveyor belt 11, however, due to the convex portion of travel of the chain, its speed relative to the second conveyor 11 in the direction said conveyor is traveling is slowed down so that the bottle tends to walk away from the transfer finger. In this manner, the bottle is freed at the end of its transfer without interference of the transfer finger. The transfer finger is slowed down by travel through the compound curvature defined by the guide members 20 and 28, whereupon the finger makes its way around the sprocket 15. This invention permits the high speed transfer of bottles with a minimum of impact of the bottle-wall against the transferring device due to the lesser angle of the chain across the dual conveyor where the initial impact occurs and the chain's concave path to position the bottles to align with the direction of travel of the single line second conveyor. As the bottles are carried onto the single line second conveyor they advance in speed relative to their transferring finger due to the faster travel of the single line conveyor with relation to the chain at that point. The fingers on the chain then take a convex path away from the bottles without the usual wiping action along their side walls. This latter feature eliminates the need for guide rails to stripper bars in releasing the bottle from the transfer finger. It should be evident that when the bottles are pushed onto the second conveyor belt they are at approximately the same time exclusively under influence of the conveyor and freed from the transfer fingers carrying up to that point, thus eliminating any wiping action which might cause the bottles to upset and jam the mechanism.

It will, of course, be understood that various details of construction may be modified through a wide range without departing from the invention, and it is, therefore, not the purpose to limit the patent granted hereon otherwise than necessitated by the scope of the claims.

I claim:

1. In a glassware transfer mechanism, the combination with a first traveling conveyor and a second traveling conveyor adjacent a span of the first and angularly disposed in travel therefrom, of means overlying said first and second conveyors and traveling across said first conveyor and coextensive along a longitudinal adjacent end portion of said second conveyor for intercepting glassware articles traveling on said first conveyor and transferring them in a single line traveling position on said second conveyor, said means comprising a frame, an endless transfer chain, spaced apart sprockets rotatably mounted on said frame and in mesh with said chain, one of said sprockets being adapted to drive said chain, a plurality of laterally projecting transfer fingers mounted on said chain at spaced distances therealong, stationary guide means in engagement with said chain intermediate the sprockets for guiding it through an initial straight-line path diagonally across the first conveyor at an angle to the direction of travel of said second conveyor, thence through an adjoining intermediate concave path that aligns with the direction of travel of said second conveyor, and thence through an adjoining convex path divergent from the direction of travel of said second conveyor at a point overlying it.

2. In a mechanism for transferring articles, such as glass jars or the like, from a first traveling conveyor to a second traveling conveyor, said transfer effecting a change in direction of said articles, in combination, a frame extending across the first conveyor, an endless carrier chain, means mounted on said frame to support said chain, said means being adapted to drive it in horizontal endless travel so that a portion of said chain extends over adjacent portions of said first and second conveyors, a plurality of laterally projecting transfer fingers carried by said chain at substantial equally spaced distances and engageable with such articles being carried on the first conveyor to impel them from the first conveyor toward the second conveyor when said chain is driven in that direction, means to guide the said chain through a span for effecting said transfer, said means being engageable with said chain to define a contiguous path therefor, said path having an initial straight segment which extends diagonally across and in the direction of travel of the first conveyor, and at an angle to the travel to said second conveyor, an intermediate concave segment terminating in substantial alignment with the direction of travel of said second conveyor, and a succeeding convex segment becoming divergent to the direction of travel of said second conveyor.

3. In a mechanism for transferring articles, such as glass jars or the like, from a first traveling conveyor surface across an intermediate dead plate surface and onto a second traveling conveyor surface that is adjacent and angularly disposed from the first, the improvement for transferring said articles at high speed, said improvement comprising a frame extending across said first conveyor, an endless carrier chain, a pair of horizontally spaced sprockets mounted on said frame and in mesh with said chain and adapted to drive the chain in horizontal endless travel so that a portion of said chain extends over adjacent portions of said first and second conveyors, a plurality of equally spaced transfer fingers mounted on said chain for travel therewith, and engageable with articles carried on said first conveyor to impel them toward said second conveyor, a first guide member mounted on said frame such that at least a portion of it overlies said first conveyor and is in engagement with the said chain at its outwardly facing surface, and a second guide member mounted on said frame to partially overlie said second conveyor and in engagement with the said chain at its inwardly facing surface, said first and second guide members being disposed intermediate said sprockets and cooperating to provide a guide path for said chain during transfer of articles which path is of compound curvature and comprises respectively, a concave portion and concurrent convex portion, said concave portion guiding the chain into horizontal alignment with the secondary conveyor while transferring an article by one of said transfer fingers and said convex portion thence guiding the chain to effectively slow its speed relative to movement of said secondary conveyor in the direction of travel of the latter after transfer of the article thereto, thereby freeing the article from its said transfer finger without interference therebetween.

4. In a mechanism for transferring articles, such as glass jars or the like, from a first traveling conveyor to a second traveling conveyor, said transfer effecting a change in direction of said articles, in combination, a frame extending across the first conveyor, an endless carrier chain, means mounted on said frame to support said chain, said means being adapted to drive it in horizontal endless travel so that a portion of said chain extends over adjacent portions of said first and second conveyors, a plurality of laterally projecting transfer fingers carried by said chain at substantial equally spaced distances and engageable with such articles being carried on the first conveyor to impel them from the first conveyor toward the second conveyor when said chain is driven in that direction, means for guiding said chain across the first conveyor and over the second conveyor to intercept articles traveling on said first conveyor and impel them toward said second conveyor by engagement therewith of a transfer finger on said chain and to align them with the second conveyor, each said transfer finger traveling in a straight line path diagonally over the first conveyor whereat said article is engaged by said transfer finger, whereupon said transfer finger and article travel in a concave path terminating in substantial alignment with said second conveyor along its direction of travel and over said second conveyor, and thereafter said transfer finger travels in a convex path becoming divergent from the second conveyor, whereby the paths of said article and said transfer finger diverge and the article is freed from its transfer finger.

References Cited in the file of this patent

UNITED STATES PATENTS

| | | |
|---|---|---|
| 2,007,981 | Nordquist | July 16, 1935 |
| 2,547,729 | Aiken | Apr. 3, 1951 |
| 2,616,550 | Rowe | Nov. 4, 1952 |